(12) United States Patent
Conner et al.

(10) Patent No.: US 8,056,838 B2
(45) Date of Patent: Nov. 15, 2011

(54) LAWN SPREADER HOPPER FLOW CONTROL APPARATUS

(75) Inventors: Lee Robert Conner, Bellflower, IL (US); Ronald Joe Hickenbottom, Sullivan, IL (US); Danney Dendy, Sullivan, IL (US)

(73) Assignee: Agri-Fab, Inc., Sullivan, IL (US)

( * ) Notice: Subject to any disclaimer, the term of this patent is extended or adjusted under 35 U.S.C. 154(b) by 318 days.

(21) Appl. No.: 12/401,204

(22) Filed: Mar. 10, 2009

(65) Prior Publication Data

US 2010/0230507 A1  Sep. 16, 2010

(51) Int. Cl.
*A01C 17/00* (2006.01)
*A01C 15/00* (2006.01)
*A01C 7/08* (2006.01)
*F16C 1/10* (2006.01)

(52) U.S. Cl. ......... 239/650; 239/73; 239/681; 239/687; 222/625; 74/500.5; 74/502.4

(58) Field of Classification Search .............. 239/73, 239/288, 379, 505, 507, 509–511, 578, 650, 239/681, 687; 222/41, 45, 623–625; 74/500.5, 74/501.5 R, 502, 502.4
See application file for complete search history.

(56) References Cited

U.S. PATENT DOCUMENTS

| | | | | |
|---|---|---|---|---|
| 2,371,958 A | * | 3/1945 | Douthitt | 111/72 |
| 2,514,962 A | | 7/1950 | McElhatton | |
| 2,678,145 A | * | 5/1954 | Juzwiak et al. | 222/609 |
| 2,710,116 A | * | 6/1955 | Juzwiak | 222/609 |
| 2,735,582 A | * | 2/1956 | Wilson | 222/43 |
| 2,840,271 A | * | 6/1958 | Liljenberg | 222/41 |
| 2,988,250 A | | 6/1961 | Ryan | |
| 3,015,416 A | * | 1/1962 | Peoples et al. | 222/41 |
| 3,122,273 A | * | 2/1964 | Atkinson | 222/41 |
| 3,135,517 A | | 6/1964 | Klema | |
| 3,172,574 A | * | 3/1965 | Hiler et al. | 222/615 |
| 3,193,142 A | * | 7/1965 | Atkinson | 222/41 |
| 3,224,636 A | * | 12/1965 | Atkinson | 222/41 |
| 3,484,845 A | | 12/1969 | Warner et al. | |
| 3,979,071 A | | 9/1976 | Biggs, Jr. | |
| 4,032,074 A | | 6/1977 | Amerine | |
| 4,180,184 A | * | 12/1979 | Florer et al. | 222/41 |
| 4,402,438 A | | 9/1983 | Gregory | |
| 4,511,090 A | | 4/1985 | Morgan | |
| 4,588,133 A | * | 5/1986 | Brabb et al. | 239/681 |
| 4,671,434 A | | 6/1987 | Johnston et al. | |
| 4,903,541 A | | 2/1990 | Shiota | |
| 5,190,225 A | | 3/1993 | Williams | |
| 5,370,321 A | | 12/1994 | Bianco | |
| 5,584,732 A | | 12/1996 | Owen | |

(Continued)

*Primary Examiner* — Darren W Gorman
(74) *Attorney, Agent, or Firm* — Vedder Price P.C.

(57) ABSTRACT

A control mechanism for a lawn spreader controls output flow of granular material out of the spreader hopper by adjusting the position of a control cable anchor point. The control mechanism includes a clamping portion for clamping to a tubular handle of the spreader. A top surface of the clamp portion, adjacent to the handle, provides a slide for a slideable cable anchor shuttle, which internally provides the anchor point for a control cable. The shuttle may be made from a plastic material. A dial housed within a dial housing, adjacent to the slide portion of the clamp, may be rotated to various indicated positions which in turn controls the position of the shuttle on the metal slide portion of the clamp, thereby adjusting the position of the control cable anchor point. The control cable extends from the end of the shuttle anchor mechanism to a hopper spring-loaded aperture cover.

17 Claims, 12 Drawing Sheets

U.S. PATENT DOCUMENTS

| | | |
|---|---|---|
| 5,597,092 A | 1/1997 | Havlovitz |
| 6,138,927 A | 10/2000 | Spear et al. |
| 6,616,074 B2 | 9/2003 | Courtney et al. |
| 6,945,481 B2 | 9/2005 | Thompson et al. |
| 7,063,280 B1 | 6/2006 | Bogart et al. |
| 2006/0157518 A1* | 7/2006 | Havlovitz et al. ............ 222/617 |

* cited by examiner

FRONT VIEW

LAWN SPREADER HOPPER FLOW CONTROL APPARATUS

FIELD OF THE DISCLOSURE

The present disclosure is related to lawn spreaders and to control apparatuses for controlling flow of material from the spreader hopper, and to deflectors for preventing broadcast materials from being impelled toward flowers and shrubbery.

BACKGROUND

Lawn spreaders are used to provide a controlled distribution of materials such as granular fertilizers onto a lawn surface. Broadcast spreaders include a hopper with a variable flow aperture that is controllable to regulate the amount of materials allowed to drop from the hopper through the aperture and onto an impeller. The impeller rotates with the movement of the spreader and distributes the material outwardly from the impeller.

Control mechanisms are usually provided on a broadcast spreader, to adjust the variable flow aperture by adjusting the length of a control cable. Such mechanisms are difficult to assemble and service because they require disassembly at one or more points for service and also require the assembler or maintainer to get the cable routing just right through the mechanism, so that the length adjustment mechanism will continue to work properly. Other control mechanisms may not allow for disassembly and therefore are not maintainable. Further, broadcast spreader deflector mechanisms that are cable controlled are also difficult to maintain for similar reasons.

Therefore a need exists for a simplified control mechanism for spreader flow control and also for deflectors, such that ease of use, assembly and maintenance is better facilitated.

DETAILED DESCRIPTION

Figure 1:
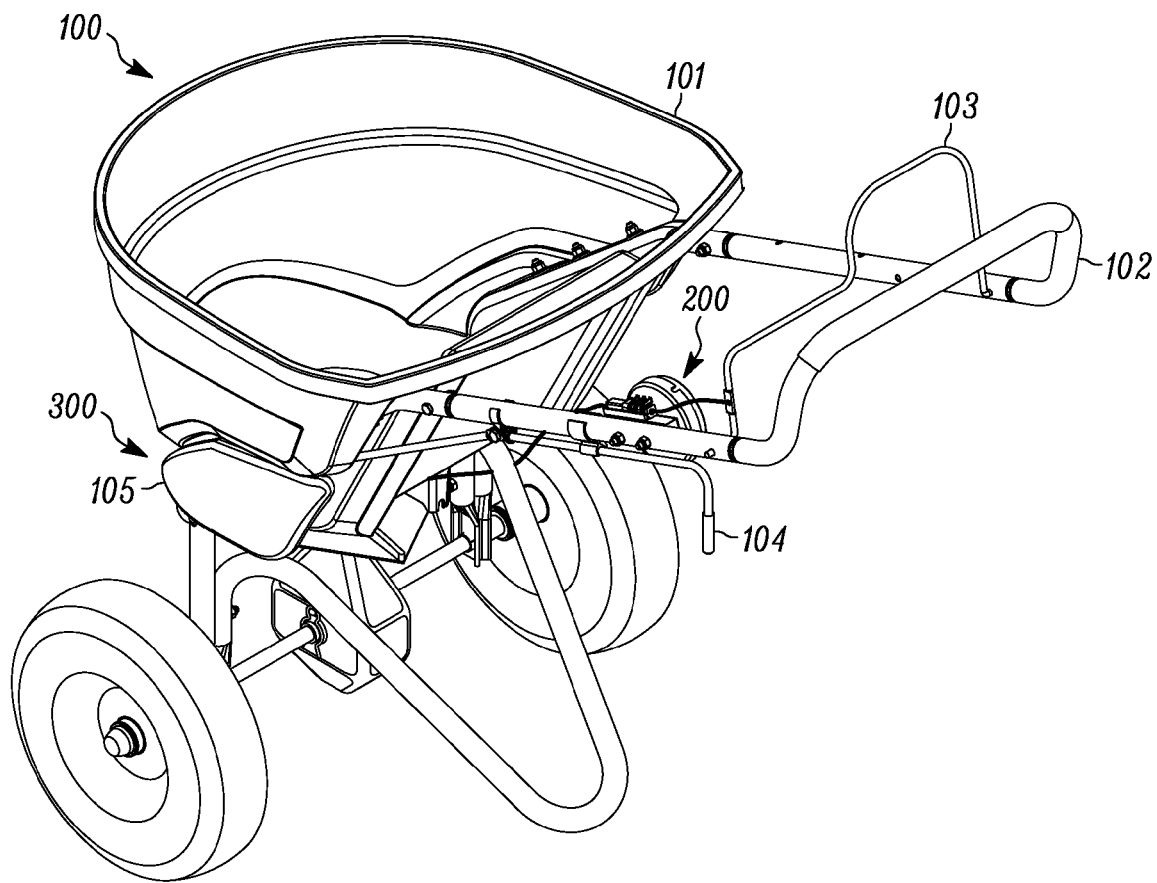
FIG. 1 is a perspective view of a broadcast lawn spreader in accordance with the embodiments.

The present disclosure provides a control mechanism for a broadcast spreader that controls output flow of granular material into the spreader hopper by controlling the position of an anchor point of a control cable. The control mechanism includes a clamping portion for clamping to a tubular handle of the spreader via two bolts that pass through the tubular handle. A top surface of the clamp portion, immediately adjacent to the tubular handle, provides a slide, or glide surface, for a slideable cable anchor or shuttle, which internally provides the anchor point of a control cable. The shuttle may be made from a plastic material.

The control mechanism also includes a dial mechanism housed within a dial housing that is a circular cup portion, adjacent to the slide portion of the clamp. The dial may be rotated to various indicated positions which in turn controls the position of the shuttle on the metal slide portion of the clamp, thereby adjusting the position of the control cable anchor point. The control cable extends from the end of the shuttle anchor mechanism to a hopper spring-loaded aperture cover.

The cable is fixed at a connection point on the hopper mechanism such that tension on the cable pulls the spring-loaded aperture cover into various open positions to control the amount of granular material dispensed from the hopper into the spreader mechanism. The movement of the slideable shuttle and thus the cable anchor point decreases or increases the tension between the cable anchor point and the spring-loaded aperture cover. By adjusting this cable tension which is calibrated to numerical positions on the control dial, the amount of granular material dispensed is controlled. The slideable cable anchor or shuttle may be plastic or any suitable material that would allow it to slide against the clamp mechanism. The entire control assembly therefore includes the clamp or control housing, a control knob internal to the control housing and the slideable cable anchor or shuttle which slides on the portion of the control housing or clamp adjacent to the tubular handle of the spreader.

Adjusting the anchor point of the cable is different than previous known spreader controls because previous known spreader controls varied the length of the control cable or adjusted the length of the control cable while keeping the two ends of the cable in a fixed position.

The present disclosure also provides a deflector mechanism for a broadcast spreader that controls direction of the broadcast output flow of the granular material. The deflector is engaged via sliding the deflector shield/s into and out of position using a slide-able control lever at the push handle of the broadcast spreader.

The deflector is mounted on a wire formed deflector mounting bracket and is linked to wire formed control rods. The deflector shield slides from one end of the bracket to the other, that is, from a stored position at one end, to an operating position at the opposite end, as controlled by the linkages to the control lever located on the push handle.

Turning now to the drawings wherein like numerals represent like components, FIG. 1 is a perspective view of a push lawn spreader 100 having a push handle 102 in accordance with the embodiments. The lawn spreader 100 includes a hopper 101 that may feed an impeller apparatus as understood by those of ordinary skill. However, the lawn spreader 100 also includes a hopper flow control apparatus 200 in accordance with the embodiments. The hopper flow control apparatus 200 is adjustable such that the flow of material from the hopper 101 to the impeller apparatus is regulated. An operator pulls on control lever 103 to operate the hopper flow control apparatus 200 to release material from the hopper 101 as the lawn spreader 100 is pushed using push handle 102. Some embodiments of the lawn spreader 100 may also include a deflector assembly 300 which includes at least one deflector shield 105 and deflector shield control handle 104.

Figure 2:
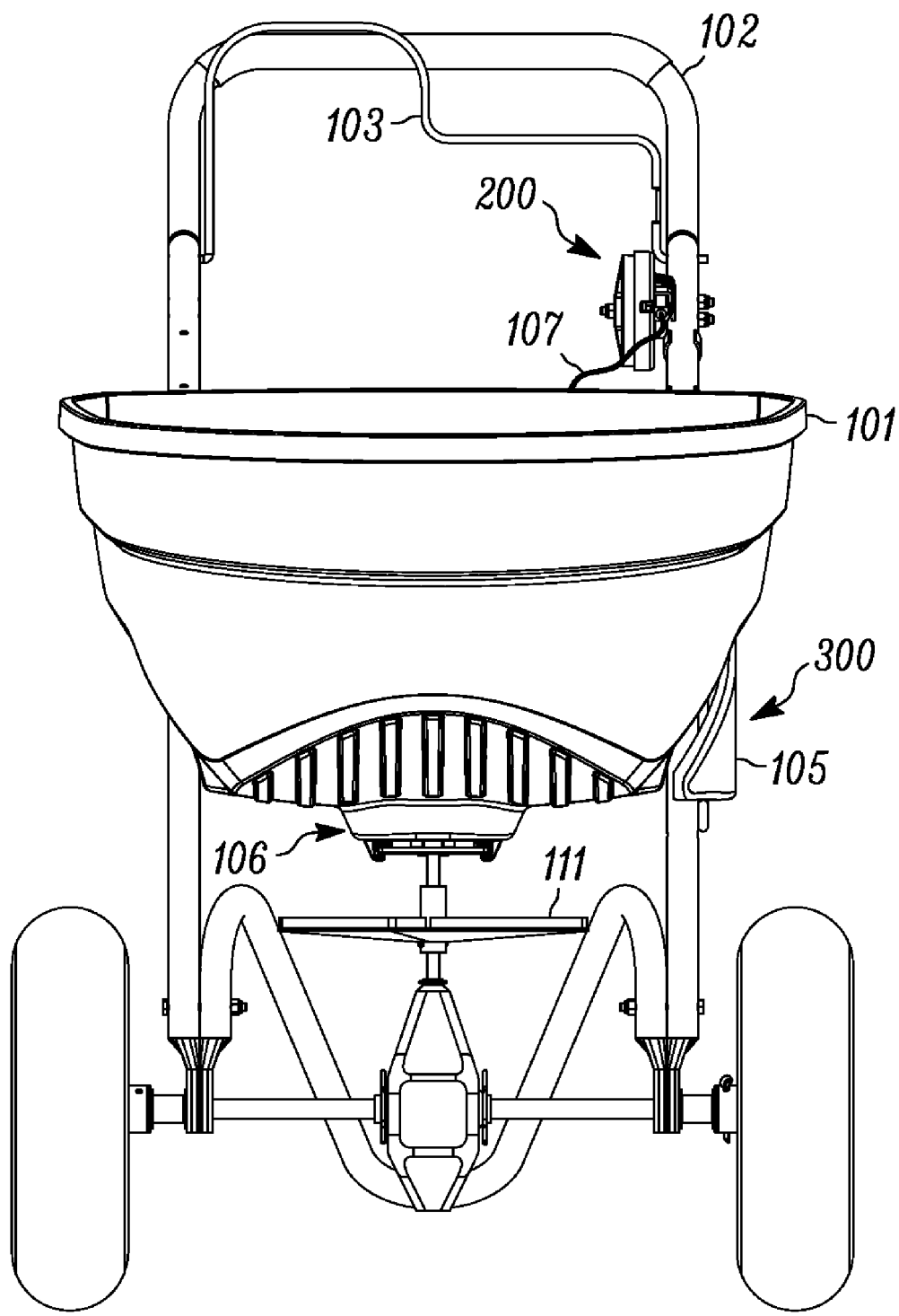
FIG. 2 is a front view of the broadcast lawn spreader embodiment shown in FIG. 1.

FIG. 2 is a front view of the lawn spreader 100 and shows the hopper aperture mechanism 106, which is controlled by hopper flow control apparatus 200, and which feeds the underlying impeller apparatus. The hopper flow control apparatus 200 is connected to the hopper aperture mechanism 106 via a control cable 107. The hopper aperture mechanism 106 includes a spring loaded aperture cover as understood by those of ordinary skill. The hopper aperture mechanism 106 also includes a control cable 107 termination point. The control cable 107 is a sheathed control cable, sometimes referred to as a "Bowden" cable. That is, the control cable 107 has an inner core 110, an inner housing and an outer sheath that is anchored at both ends. An inner housing of the control cable 107 provides a tension on the cable core 110 as it slides within the housing in response to a pulling force a one end. A barrel adjuster at one or both ends of the control cable 107 may be adjusted to adjust the tension on the cable with respect to a fixed anchor point. Unlike previous control systems, the hopper flow control apparatus 200 of the embodiments adjusts the effective length of the cable by adjusting the anchor point at the control apparatus 200, while the hopper aperture termination point remains fixed.

Figure 3:
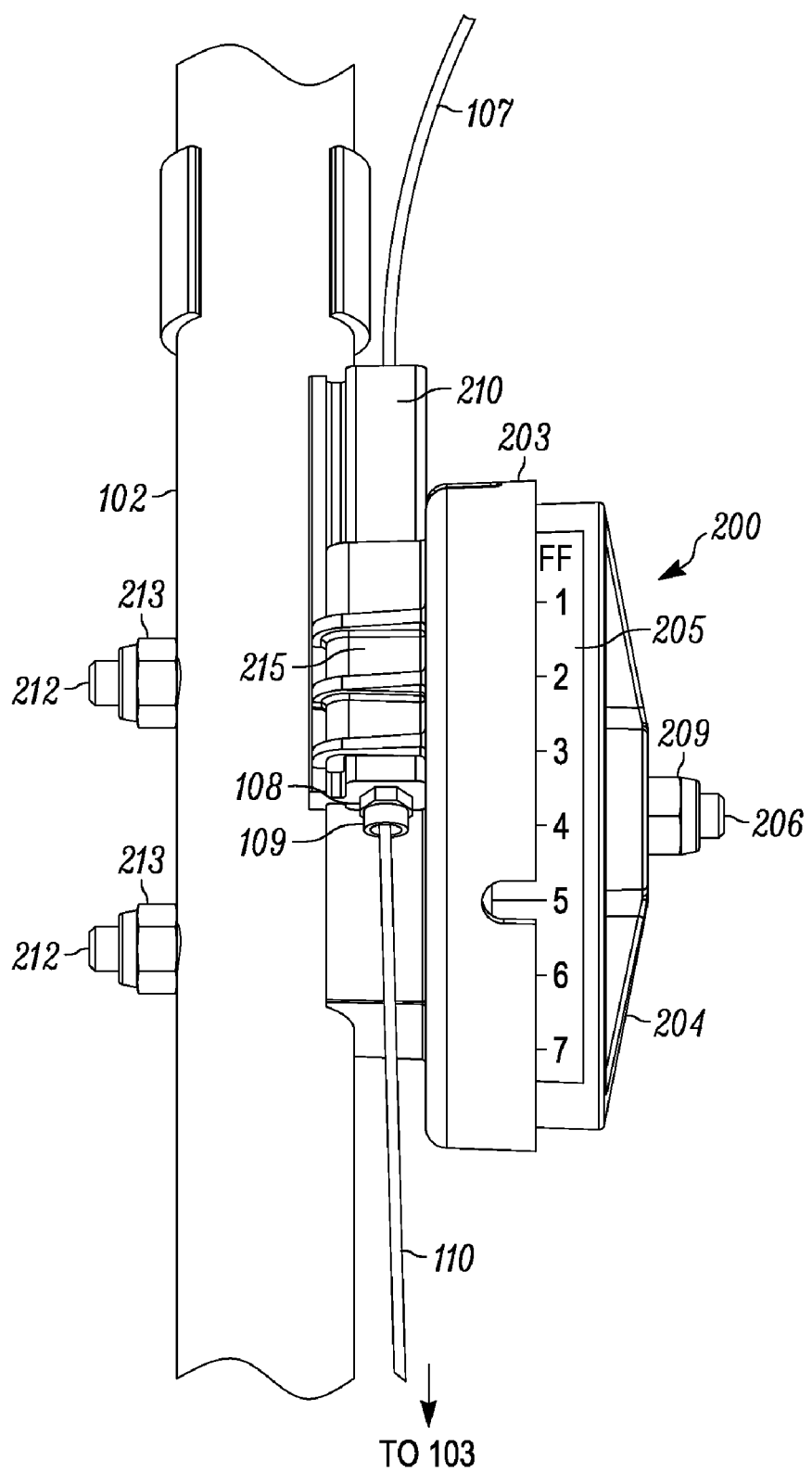
FIG. 3 is a top view of a lawn spreader hopper flow control in accordance with the embodiments.

FIG. 3 is a top view of the hopper flow control apparatus 200 and provides additional details. The hopper flow control apparatus 200 includes a circular cup shaped dial housing 203, that is clamped to the tubular handle 102 of the lawn spreader 100. The dial housing 203 holds a dial front 204 having adjustment indicia 205. The dial front 204 is secured to the dial housing 203 via a center bolt 206. An anchor shuttle 210 provides a moveable anchor point 109 for the control cable 107, which is held in place by a nut assembly, which includes nut 108, and which is part of the control cable 107 assembly in that it is included with the control cable 107. The control cable 107 core 110 protrudes from the anchor point 109 and is fixedly attached at the control lever 103. The inner housing and protective sheath of the control cable 107 are held in place at the anchor point 109.

A shuttle guide 215 maintains the shuttle 210 in place such that the shuttle 210 may only move linearly, forward and back, along the direction of the handle 102. The shuttle 210 may have slots or grooves, such as the upper and lower slots shown in FIG. 4 and FIG. 5, for mating with corresponding upper and lower edges of the shuttle guide 215. Adjusting the dial front 204 to an indicated position, indicated by indicia 205, will move the shuttle 210 to a corresponding position to either increase or decrease the cable tension between the anchor point 109 and the control lever 103. By making such an adjustment, the extent to which the spring loaded aperture cover of the hopper aperture mechanism 106 will open is controlled, thereby controlling the amount of material that is released from the hopper 101 to the impeller.

Figure 4:
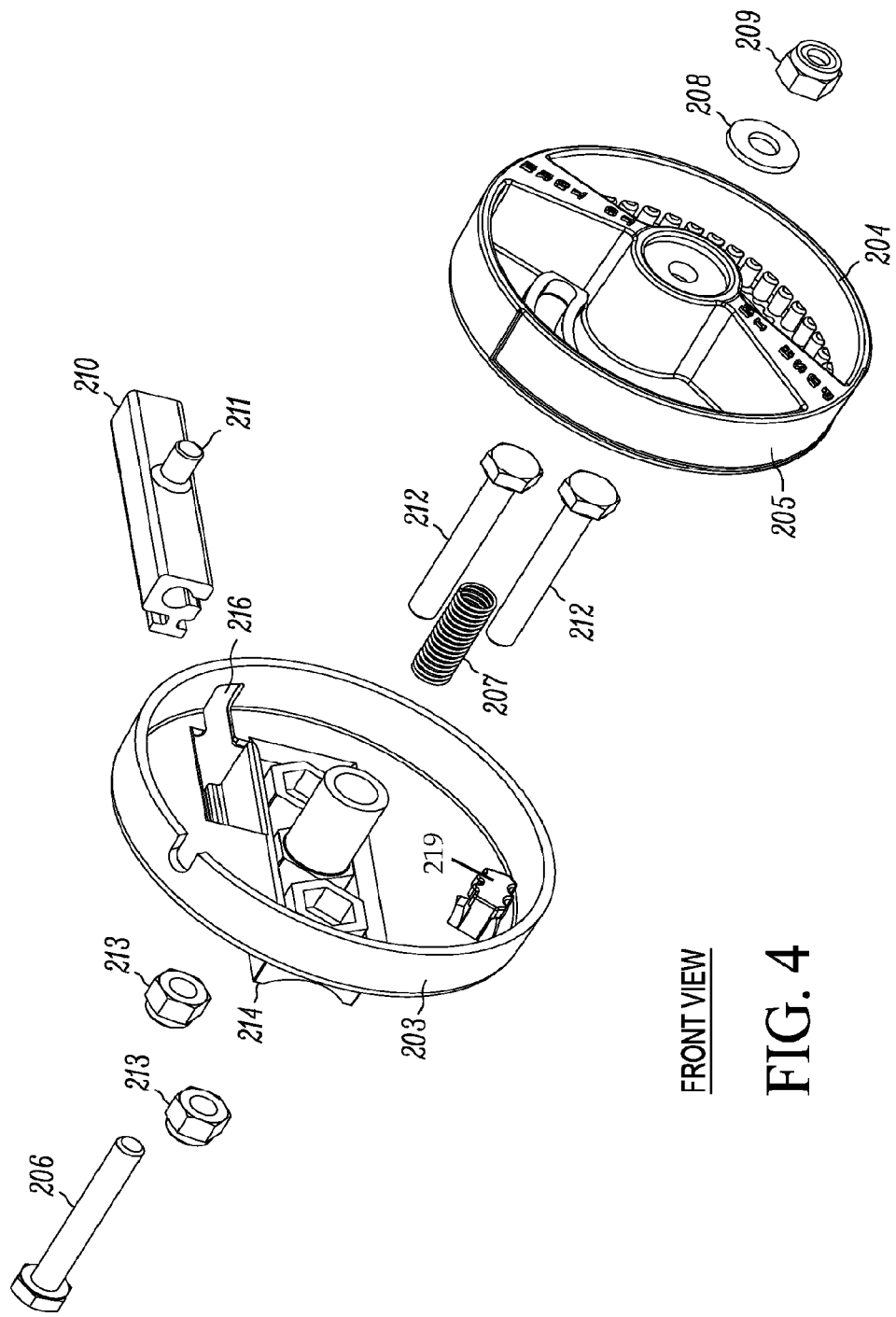
FIG. 4 is a perspective assembly drawing front view of the lawn spreader hopper flow control shown in FIG. 3.
Figure 5:
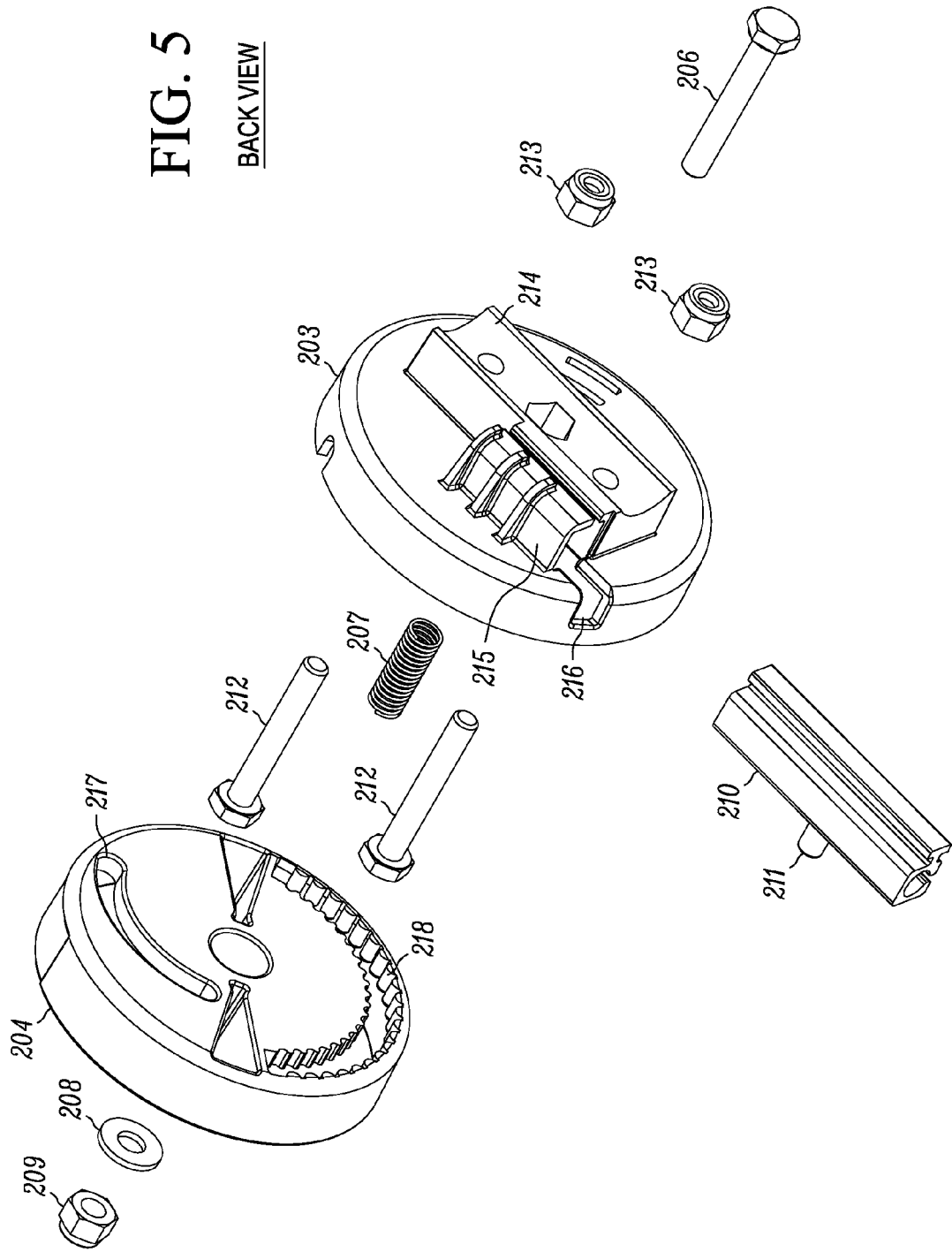
FIG. 5 is a perspective assembly drawing rear view of the lawn spreader hopper flow control shown in FIG. 3.

FIG. 4 and FIG. 5 provide further details of the hopper flow control apparatus 200 and facilitate an understanding of its operation. FIG. 4 is a perspective assembly drawing front view of the hopper flow control apparatus 200 and FIG. 5 is a perspective assembly drawing rear view. The dial housing 203 includes a bar clamp 214 which has a curvature similar to that of the tubular handle 102. The dial housing 203 may be clamped to the tubular handle 102 via the bar clamp 214 using two clamping bolts 212 which are fasted to the handle 102 using two lock nuts 213. The two primary components of the hopper flow control apparatus 200, that is, the dial housing 203 and the dial front 204, are held together by center bolt 206 which passes through a center position of the bar clamp 214. The bar clamp 214 includes a recess to accept the center bolt 206 bolt head such that it does not impede clamping the bar clamp 214 to handle 102.

The center bolt 206 is inserted through the bar clamp 214, through a center spring 207, and through the dial front 205, and is secured using a washer 208 and nut 209. The center spring 207 is a compression spring that pushes the dial front 204 forward. The pushing force of center spring 207 allows the dial front 204 to lock in place using a dial lock 219 which protrudes from the internal surface of dial housing 203 as shown in FIG. 4.

The anchor shuttle 210 includes a follower 211 which facilitates movement of the shuttle 210 via a cam slot 217 which is best seen in FIG. 5. The shuttle 210 includes a slotted edge that is slotted to fit into a shuttle guide 215 of the dial housing 203. A slot 216 is provided in the dial housing 203, so that the shuttle 210 may be slid onto the top surface of the bar clamp 214, and into the shuttle guide 215. The slot 216 allows the follower 211 to be installed within the dial housing 203. As can be seen in FIG. 5, when the dial front 204 is installed into the dial housing 203, the shuttle 210 follower 211 will insert into the cam slot 217. As the dial front 204 is rotated within the dial housing 203, the cam slot 217 will push or drag the follower 211 and thereby cause the shuttle 210 to move linearly with respect to the top surface of the bar clamp 214, which acts as a slide for the shuttle 210.

The dial front 204 includes locking teeth 218 which are best seen in FIG. 5. A section of the locking teeth will engage with the dial lock 219 to prevent the dial front 204 from turning out of a selected position. By pushing the dial front 204 against the force of center spring 207, the locking teeth 218 are moved back and out of engagement with the dial lock 219, thereby allowing the dial front 204 to be turned within the dial housing 203. When a selected position is reached, as indicated by the indicia 205 on the dial front 204, the dial front 204 may be released. The center spring 207 will then push the dial front 204 outward, such that a section of the locking teeth 218 at the selected indicated position, engage with the dial lock 219 and lock the dial front 204 into the selected position.

Figure 6:
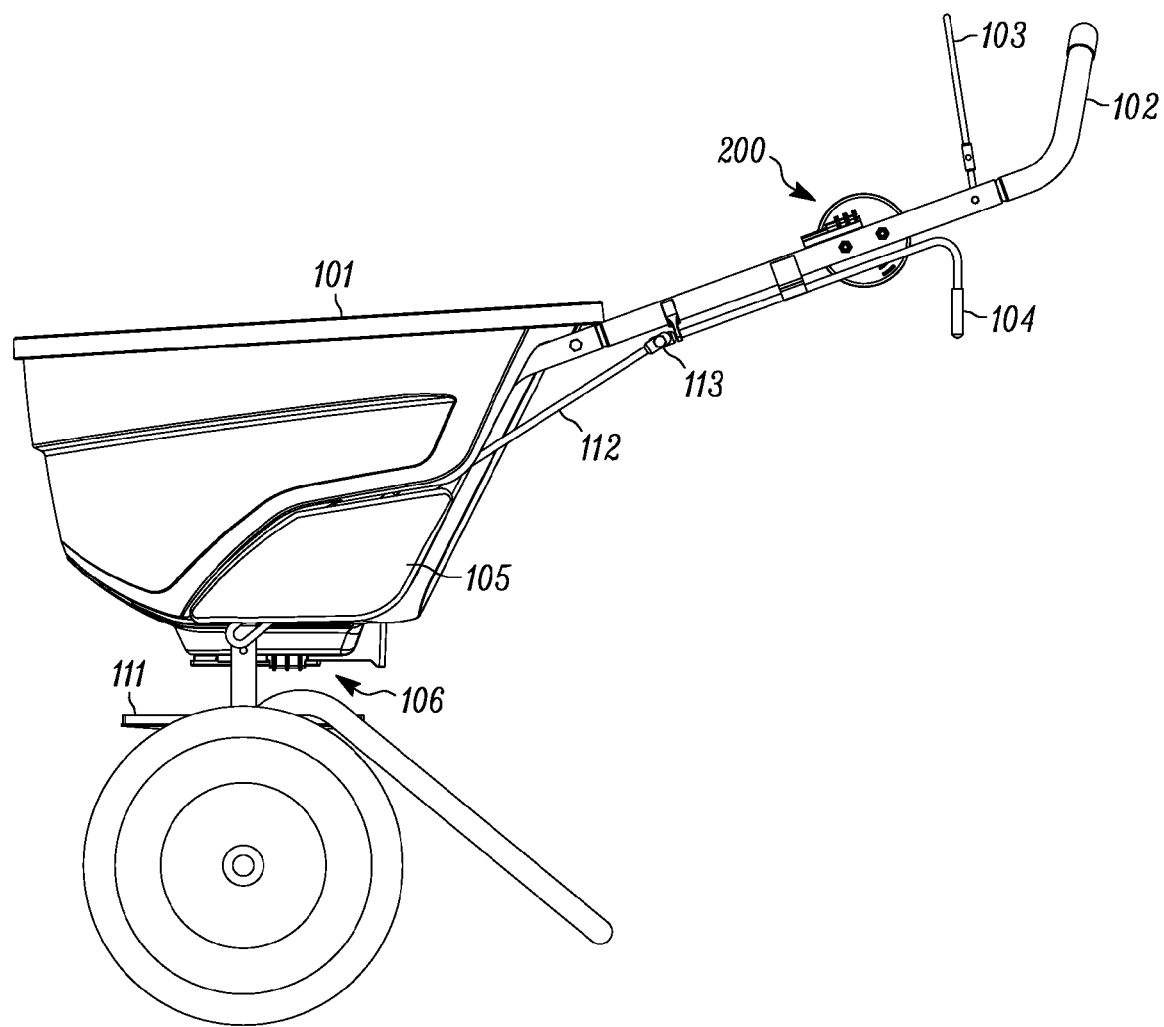
FIG. 6 is a side view of the broadcast lawn spreader shown in FIG. 1 and FIG. 2.

The shuttle 210 has a cylindrical aperture with a diameter large enough so that the control cable 107 can be passed through and anchored, via one of the control cable 107 end connectors, as is shown in FIG. 3. Therefore when the dial front 204 is rotated, the shuttle 210, and therefore the anchor point 109 of the control cable 107, is moved to change the effective length of the control cable 107. This in turn adjusts the amount by which spring loaded aperture cover, of the hopper aperture mechanism 106, will open in order to release material from the hopper 101 to the impeller. FIG. 6 is a side view of the lawn spreader 100 and is useful for understanding how the hopper flow control apparatus 200 of the embodiments is operated. The operator adjusts a control dial, that is the dial front 204, of the hopper flow control apparatus 200, to an indicated position for releasing a desired amount of material from the hopper 101. Adjustment of the dial front 204 causes a shuttle 210 to slide linearly, forward or backward, and thereby move the anchor point 109 of a control cable 107. The effective length of the control cable 107 is thereby either increased or reduced. When the operator pushes the lawn spreader via handle 102, the operator may pull control lever 103 which is attached to the core 110 of control cable 107.

The hopper aperture mechanism 106 will accordingly respond by opening a spring loaded aperture in response to the control cable 107 tension, and release material from the hopper 101.

Figure 7:
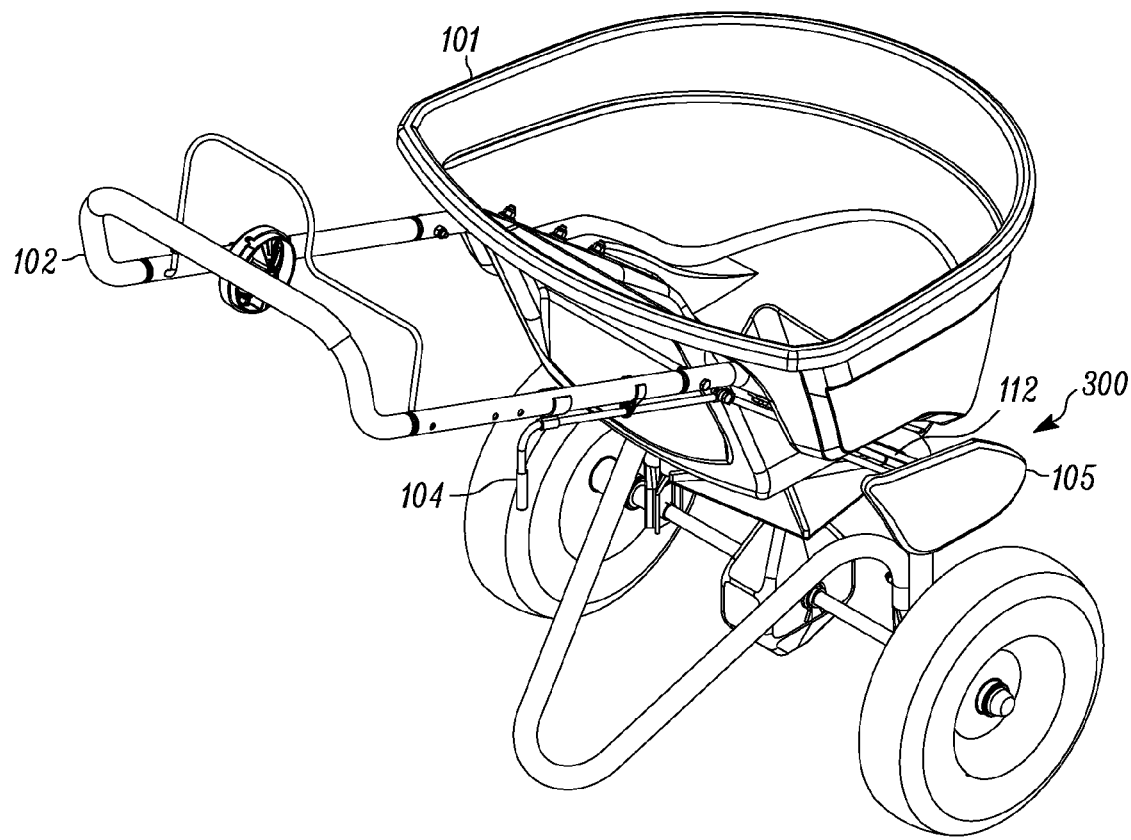
FIG. 7 is a perspective view of a broadcast lawn spreader, having a deflector assembly and control mechanism installed on the other side of the hopper, opposite to what is shown in FIG. 6, and shows further details of the deflector assembly and control mechanism, where the deflector shield is in a deployed position, in accordance with an embodiment.

FIG. 6 also illustrates a deflector shield 105 and a control handle 104 which are part of a deflector assembly 300. The deflector shield 105 may be deployed using control handle 104, to control direction of the broadcast output flow of the granular material from the impeller The deflector is engaged via sliding the deflector shield/s into and out of position using a slide-able control handle 104 at the push handle 102 of the broadcast spreader. The deflector shield 105 is mounted on a deflector mounting bracket, which may be a wire formed bracket in some embodiments, and is linked to control rod 112 which is further linked to the control handle 104. The deflector shield 105 slides from one end of the bracket to the other, that is, from a stowed position at one end, to an operating or deployed position at the opposite end, as controlled by the linkages to the control lever 104 located on the push handle 102. The perspective view of FIG. 7 shows an embodiment having the deflector shield installed on the other side of the hopper from the FIG. 6 embodiment, where the deflector shield is deployed and where the control handle 104 has been pushed forward, along the side of the push handle 102. Therefore, in accordance with the embodiments, a deflector shield may be installed on only one side, or on both sides of the hopper.

Figure 8:
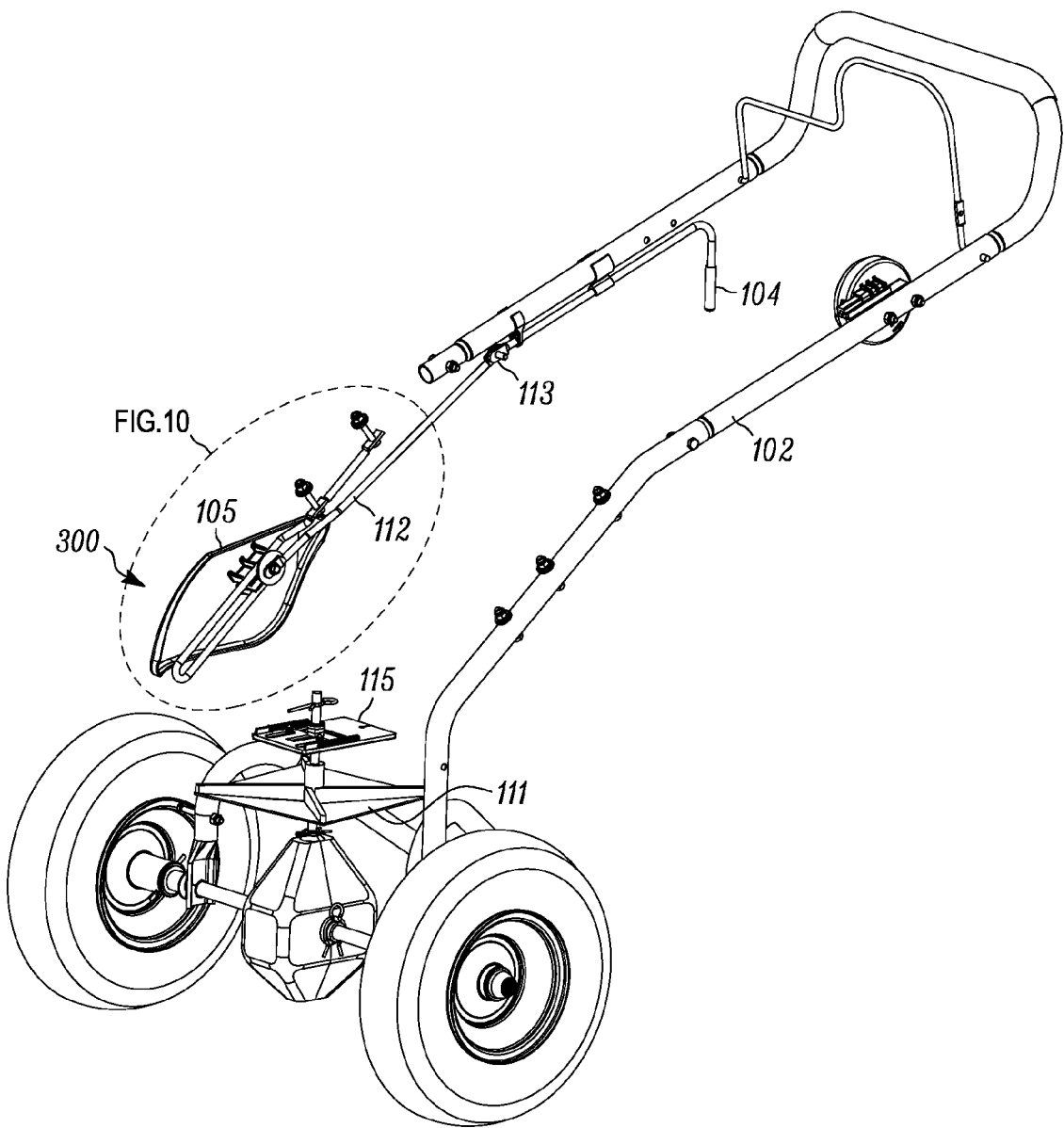
FIG. 8 is a view of a broadcast spreader having a deflector assembly in accordance with an embodiment, with the hopper removed so that the deflector assembly is visible, and where the deflector shield is in a stowed position.

FIG. 8 is a view of a broadcast spreader with the hopper 101 removed so that the deflector assembly 300 is visible. Also visible in FIG. 8 is a spring loaded aperture cover 115 of the hopper aperture mechanism 106, which is controlled by the hopper flow control apparatus 200 of the embodiments as was described above. The deflector assembly 300 may be positioned on either side of the hopper 101, or, in some embodiments, two deflector assemblies 300 may be present, one on each side of the hopper 101. The control handle 104, is slideably attached to the push handle 102 using one or more clamps or brackets, through which the control handle 104 may linearly move, forward and back, along the length of the push handle 102 sides.

Figure 9:
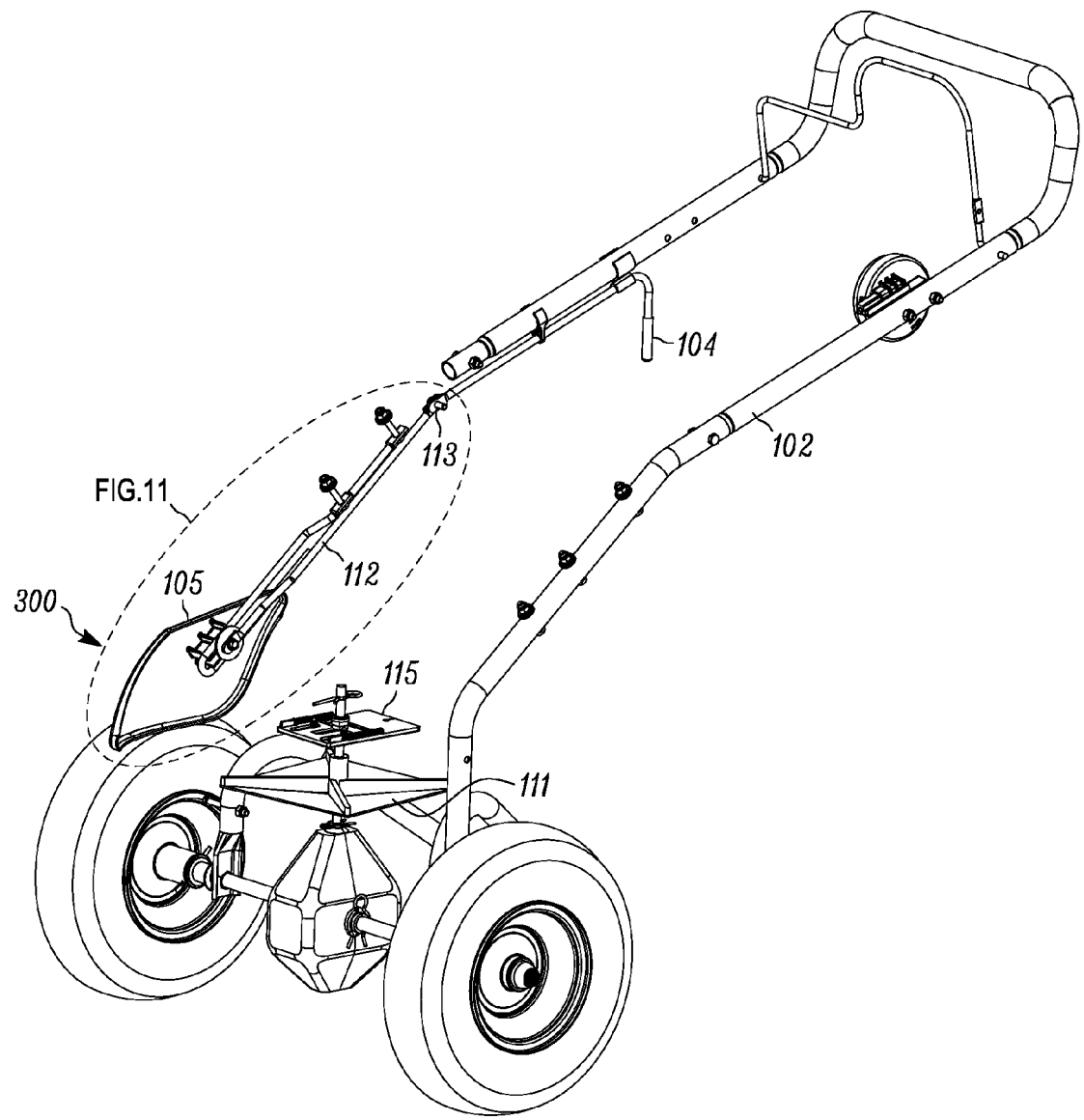
FIG. 9 is a view of a broadcast spreader shown in FIG. 8, where the deflector shield is in a deployed position.

The control handle 104 may also, in some embodiments, be attached to one or more control rods, such as control rod 112 which is attached to control handle 104 at linkage joint 113. When the control handle 104 is pulled fully back, as shown in FIG. 8, the deflector shield 105 is placed in a stowed position. FIG. 9 shows the control handle 104 pushed forward, toward the hopper 101, such that the deflector shield 105 is in an operating position or deployed. By pushing the control handle 104 forward, the deflector shield 105 is placed adjacent to the impeller plate 111 and thereby prevents material from the impeller plate 111 from being thrown back, or to the sides, and further thereby prevents the operator from being pelted with the material.

Figure 10:
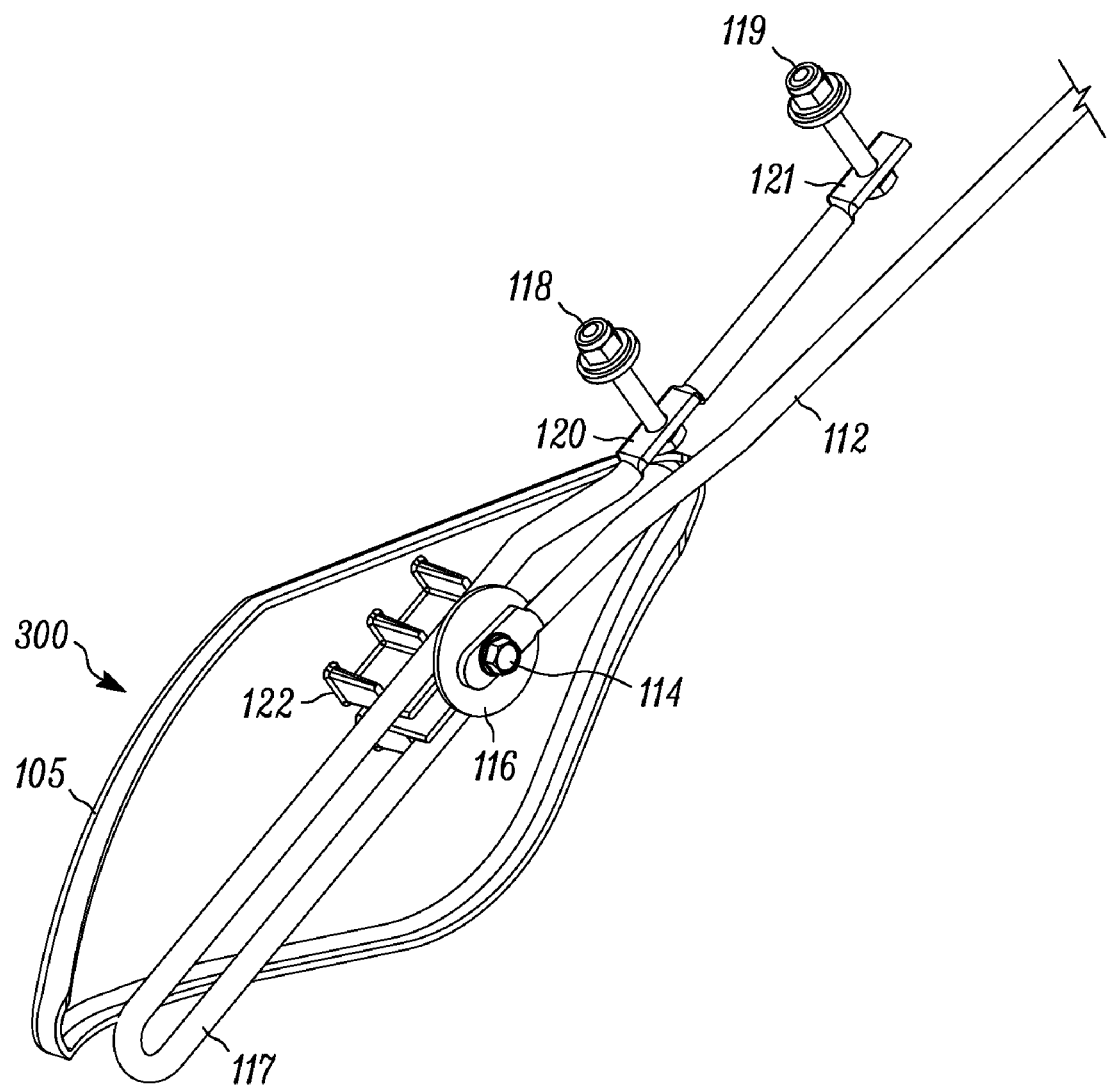
FIG. 10 is a close up view of the deflector shield in a stowed position as shown in FIG. 8.

FIG. 10 provides a close up view of the deflector shield in a stowed position as shown in FIG. 8. The deflector assembly 300 includes deflector mounting bracket 117. The deflector mounting bracket 117 may be a wire formed mounting bracket, and is attached to the spreader push handle 102 using a lower nut and bolt assembly 118 and an upper nut and bolt assembly 119. The wire formed deflector mounting bracket 117, includes a bend with a curved end as shown, which has an extended U-shape appearance or a trombone-like appearance, that is, like a tuner slide or bumper end of a trombone. In other words, the deflector mounting bracket 117 includes a portion having an upper and a lower rail. That is, the deflector mounting bracket 117 includes a portion having two parallel rails, on which the deflector shield 105 may slide forward to a deployed position and backward to a stowed position. The lower and upper nut and bolt assemblies 118, 119 connect to corresponding lower and upper holes drilled through the push handle 102 at appropriate locations. The deflector mounting bracket 117 may include a lower crimp 120 and an upper crimp 121 having corresponding lower and upper bolt holes to facilitate mounting to the push handle 102. In some embodiments, the deflector mounting bracket 117 may be mounted to the hopper 101, rather than the push handle 102.

FIG. 10 also shows a control rod 112, which may be a wire formed control rod, and which is attached to the deflector shield 105 via a bolt 114 and washer 116. The washer 116 facilitates sliding of the deflector shield 105 along the length of the deflector mounting bracket 117. The deflector shield 105 includes a deflector slide 122 which, in one embodiment, fits within the defector mounting bracket 117 and acts as a positional guide as the deflector shield 105 slides forward and back within the defector mounting bracket 117.

Figure 11:
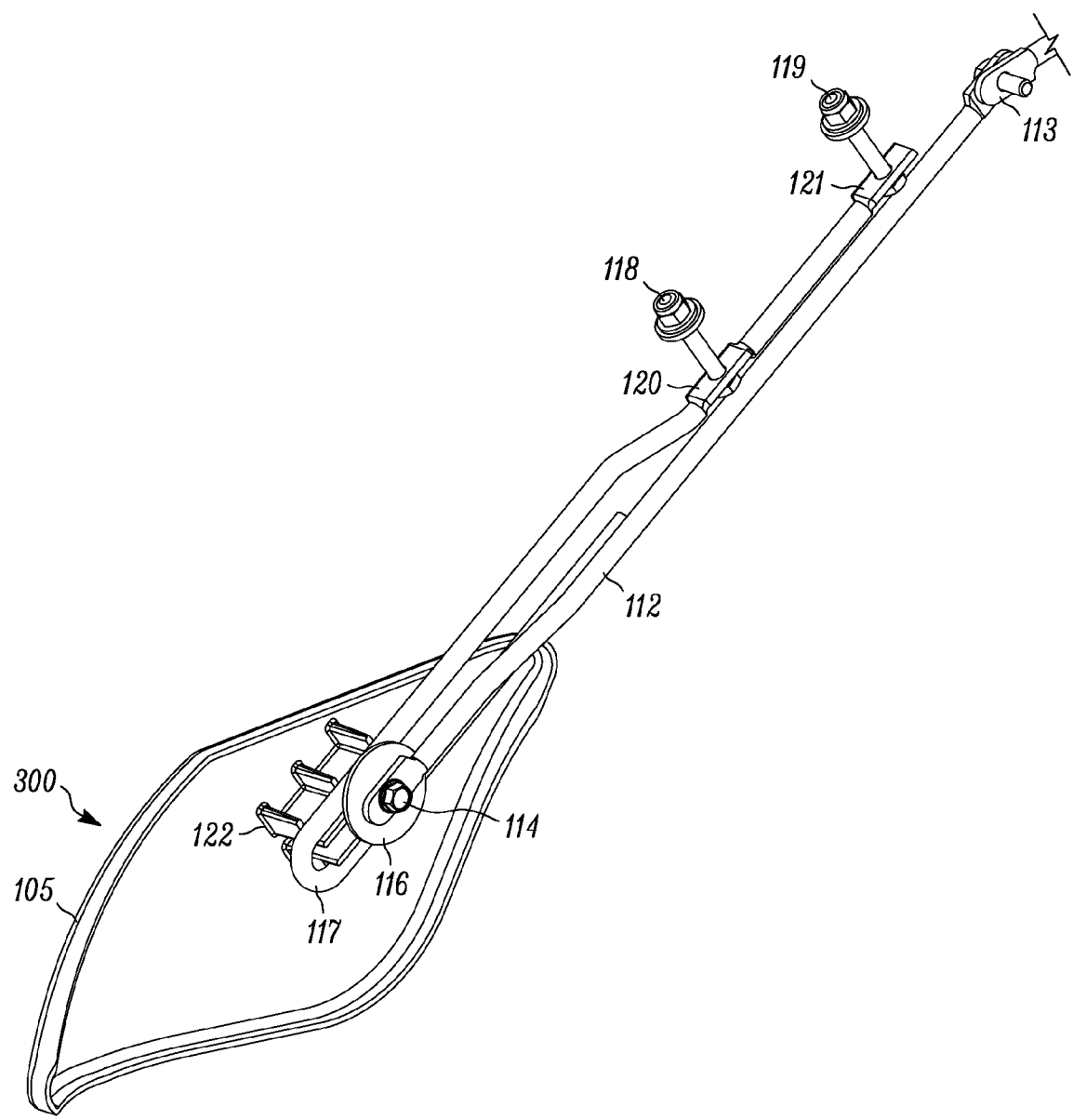
FIG. 11 is a close up view of the deflector shield in a deployed position as shown in FIG. 9.

FIG. 11 is a close up view of the deflector shield in a deployed position as shown in FIG. 9. In FIG. 11, the control handle 104 is pushed forward and therefore a linkage joint 113, which connects the control handle 104 to the control rod 112, is visible. The control handle 104, as well as the control rod 112 and the deflector mounting bracket 117, may all be wire formed components in the various embodiments. Because the control handle 104 is pushed forward, the deflector shield 105 is likewise pushed forward, via the control rod 112, and slides within, and along, the length of the extended U-shaped portion of the deflector mounting bracket 117, until an end of the deflector slide 122 comes into contact with end of the deflector mounting bracket 117 U-shaped portion. Other shapes may be used for the deflector mounting bracket 117 and such shapes would remain in accordance with the embodiments herein disclosed. For example, the deflector mounting bracket 117 may have a squared end, or a V-shaped end, etc.

Figure 12:
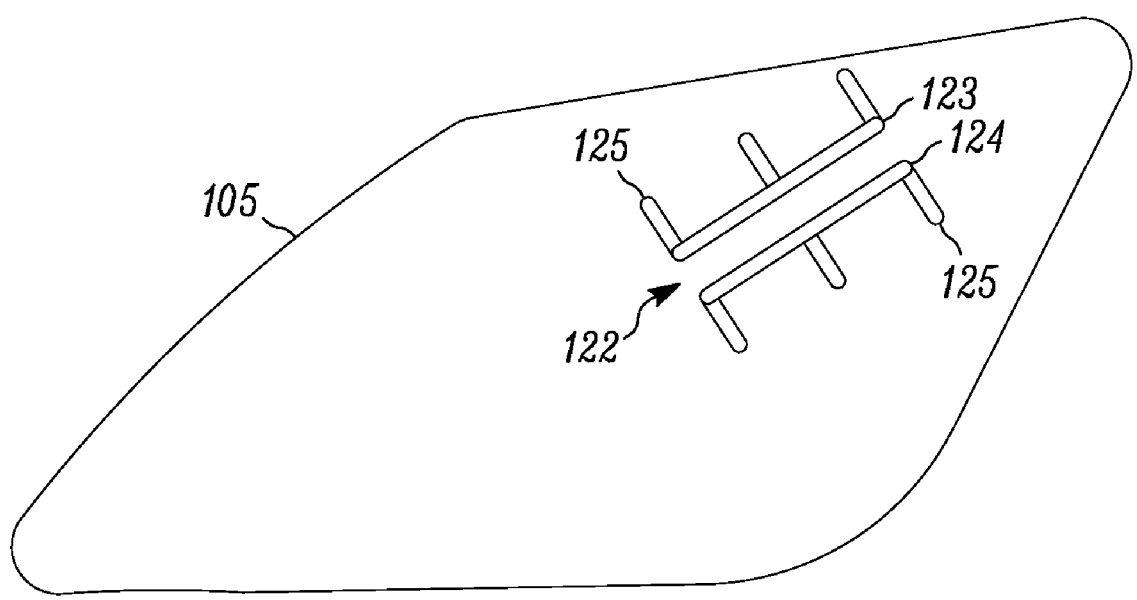
FIG. 12 is a back view of the deflector shield of FIG. 8 to FIG. 11, showing details of a deflector slide in accordance with an embodiment.

FIG. 12 is a back view of the deflector shield 105 of FIG. 8 to FIG. 11, and shows details of the deflector slide 122 in accordance with an embodiment. The deflector slide 122 may include an upper slide plate 123 and a lower slide plate 124. The upper slide plate 123 and a lower slide plate 124 come into contact with, and fit between, an upper and lower portion of the defector mounting bracket 117, that is, within the extended U-shaped portion, as is shown in FIG. 10 and FIG. 11. The upper slide plate 123 and lower slide plate 124 each include one or more stop ribs 125. The stop ribs 125 are attached to the back surface of the deflector shield 105 and are offset from the edges of the upper slide plate 123 and lower slide plate 124 so that the diameter of the deflector mounting bracket 117 wire may be positioned on the outer surface of each slide plate 123, 124, and be clamped against the stop ribs 125 by bolt 114 and washer 116. The stop ribs 125 have a height, as measured from the outer surfaces of the upper slide plate 123 or the lower slide plate 124, of about half of the wire diameter of the deflector mounting bracket 117, or greater, so as to provide sufficient clamping against the deflector mounting bracket 117 wire so that it will not slip off of the upper slide plate 123 and lower slide plate 124. However, the connection is sufficiently loose such that the deflector shield 105 may slide linearly along, and within, the U-shape portion of the deflector mounting bracket 117 when pushed or pulled by the control handle 104, and any necessary corresponding linkages.

Other variations that would be equivalent to the herein disclosed embodiments may occur to those of ordinary skill in the art and would remain in accordance with the spirit and scope of embodiments as defined herein by the following claims.

What is claimed is:

1. A hopper flow control apparatus for a lawn spreader comprising:
   a shuttle for anchoring a sheathed control cable at an anchor point, the shuttle being linearly adjustable to move the anchor point to adjust an effective length of said control cable;
   a control dial including a cam slot, wherein said shuttle includes a cam follower inserted into said cam slot; and
   a housing, wherein said control dial is positioned in said housing and connected thereto using a bolt and nut, wherein said housing comprises:
   a clamp portion for clamping to a tubular handle of said lawn spreader, said clamp portion having an arced inner surface corresponding to a tubular outer surface of said tubular handle.

2. The hopper control apparatus of claim 1, wherein said control dial comprises:
   a plurality of locking teeth for locking said control dial into a fixed position within said housing, wherein said housing includes a dial lock which is engageable with said locking teeth.

3. The hopper flow control apparatus of claim 2, comprising:
   a compression spring positioned between said housing and said control dial, wherein compressing said compression spring by applying a pushing force upon said control dial, to push said control dial into said housing, releases said locking teeth from said dial lock, and wherein upon release of said pushing force said compression spring exerts an opposite force to push said control dial outwardly with respect to said housing thereby causing said locking teeth to engage with said dial lock.

4. The hopper flow control apparatus of claim 3, wherein said bolt is inserted through said compression spring.

5. The hopper control apparatus of claim 1, wherein said housing comprises:
   a slide surface, in contact with said shuttle, wherein said shuttle is linearly adjustable by sliding linearly over said slide surface.

6. The hopper control apparatus of claim 5, wherein said housing further comprises:
   a shuttle guide, positioned over said slide surface and over said shuttle.

7. The hopper control apparatus of claim 6, wherein said shuttle has at least one slotted edge corresponding to an edge of said shuttle guide.

8. The hopper control apparatus of claim 1, wherein said control dial further comprises:
   an indicia corresponding to the flow of material from a hopper of said lawn spreader.

9. A broadcast lawn spreader including the hopper flow control apparatus of claim 1.

10. A lawn spreader hopper flow control apparatus comprising:
    a housing, including a clamp portion for mounting to a tubular handle of said lawn spreader;
    a control dial, installed within said housing, said control dial including a cam slot; and
    a control cable anchor shuttle having a cam follower and a cable anchor point for anchoring a sheathed control cable at said cable anchor point, the cam follower being inserted into said cam slot of said control dial, said control cable anchor shuttle being linearly adjustable by said cam slot to thereby move said cable anchor point to adjust an effective length of said control cable.

11. The lawn spreader hopper flow control apparatus of claim 10, wherein said control dial further comprises:
    a plurality of locking teeth for locking said control dial into a fixed position with respect to said housing, wherein said housing includes a dial lock which is engageable with said locking teeth.

12. The lawn spreader hopper flow control apparatus of claim 11, further comprising:
    a compression spring positioned between said housing and said control dial, wherein compressing said compression spring by applying a pushing force upon said control dial, to push said control dial into said housing, releases said locking teeth from said dial lock, and wherein upon release of said pushing force said compression spring exerts an opposite force to push said control dial outwardly with respect to said housing thereby causing said locking teeth to engage with said dial lock.

13. The lawn spreader hopper flow control apparatus of claim 12, further comprising:
    a central bolt connecting said control dial to said housing, said bolt being inserted through said compression spring.

14. A broadcast lawn spreader including the hopper flow control apparatus of claim 10, wherein said broadcast lawn spreader comprises:
    a hopper having a material release aperture and a spring loaded aperture cover, covering said aperture;
    a push handle, wherein said hopper flow control apparatus is installed on said push handle with two bolts, each bolt secured by a lock nut;
    a control lever; and
    a sheathed control cable, anchored at a first end near said spring loaded aperture cover and having a control cable first end core attached to said spring loaded aperture cover, said sheathed control cable anchored at a second end to said control cable anchor shuttle and having a control cable second end core attached to said control lever.

15. The broadcast lawn spreader of claim 14, further comprising:
    a deflector shield; and
    a deflector control rod, having a handle positioned near said control lever, said deflector control rod attached to said push handle and attached via linkage to said deflector shield.

16. A method of operating a lawn spreader, the lawn spreader including a hopper flow control apparatus having a housing, including a clamp portion for mounting to a tubular handle of said lawn spreader; a control dial, installed within said housing, said control dial including a cam slot; and a control cable anchor shuttle having a cam follower and a cable anchor point for anchoring a sheathed control cable at said cable anchor point, the cam follower being inserted into said cam slot of said control dial, said control cable anchor shuttle being linearly adjustable by said cam slot to thereby move said cable anchor point to adjust an effective length of said control cable, the method comprising:

adjusting said control dial to an indicated position, indicated on said control dial, and corresponding to an amount of material to be released from a hopper of said lawn spreader; and pushing said lawn spreader while pulling a control lever, said control lever connected to a core of said control cable and operatively opening a spring loaded aperture cover to a position corresponding to said indicated position on said control dial.

17. The method of claim 16, further comprising:

pushing forward a deflector control handle, said deflector control handle located on a push handle of said lawn spreader, and deploying a deflector shield adjacent to said hopper.

* * * * *